US009465966B2

(12) United States Patent
Hong

(10) Patent No.: US 9,465,966 B2
(45) Date of Patent: Oct. 11, 2016

(54) METHOD AND APPARATUS FOR RECOGNIZING BARCODE OF DEPOSITION MASK

(71) Applicant: Samsung Display Co. Ltd., Yongin (KR)

(72) Inventor: Min Pyo Hong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/171,109

(22) Filed: Feb. 3, 2014

(65) Prior Publication Data

US 2014/0374484 A1     Dec. 25, 2014

(30) Foreign Application Priority Data

Jun. 21, 2013    (KR) ........................ 10-2013-0071587

(51) Int. Cl.
     *G06K 7/10*      (2006.01)

(52) U.S. Cl.
     CPC .................. *G06K 7/10732* (2013.01)

(58) Field of Classification Search
     CPC .................. G06K 7/10722; G06K 10/851
     USPC .......................... 235/462.06, 462.09, 462.1
     See application file for complete search history.

(56) References Cited

U.S. PATENT DOCUMENTS

| 7,510,118 B2 * | 3/2009 | Ralph et al. ............. 235/462.25 |
| 8,002,187 B2 * | 8/2011 | Biss et al. ................ 235/462.25 |
| 2006/0043194 A1 * | 3/2006 | Barkan et al. ........... 235/462.45 |

FOREIGN PATENT DOCUMENTS

| KR | 10-2010-0054718 | 5/2010 |
| KR | 10-2010-0056234 | 5/2010 |
| KR | 10-2010-0090657 | 8/2010 |
| KR | 10-2012-0050950 | 5/2012 |

* cited by examiner

*Primary Examiner* — Daniel St Cyr
(74) *Attorney, Agent, or Firm* — H.C. Park & Associates, PLC

(57) ABSTRACT

A method of recognizing a barcode of a deposition mask, includes: receiving a barcode image corresponding to the barcode, the barcode image being associated with a lighting environment; determining that the barcode image is not recognizable; generating, in response to determining that the barcode image is not recognizable, one or more control signals configured to modify the lighting environment; and causing, at least in part, a second barcode image to be generated in association with a modified lighting environment.

20 Claims, 15 Drawing Sheets

METHOD AND APPARATUS FOR RECOGNIZING BARCODE OF DEPOSITION MASK

This application claims priority from and the benefit of Korean Patent Application No. 10-2013-0071587, filed on Jun. 21, 2013, which is incorporated by reference for all purposes as if set forth herein.

BACKGROUND

1. Field

Exemplary embodiments relate to an apparatus and method for recognizing a barcode of a deposition mask, and, more particularly, to a barcode recognition apparatus including one or more lamps and a barcode recognition method.

2. Discussion

Conventional barcodes may include a pattern of lines or dots, as well as contain information about a product. The barcode may be attached to the product, formed directly on the product, and/or formed inside the product. The barcode may contain information about the type and history of the product. With the barcode attached to or formed on the product, information about the product may be obtained and the history of the product may be managed. For example, the type, use history, and period of use of a deposition mask may be identified from a barcode formed on the deposition mask used in a deposition process. This enables a deposition mask to be managed and replaced.

Two types of conventional barcodes include a one-dimensional barcode and a two-dimensional barcode. A one-dimensional barcode may include a plurality of bars and display information corresponding to a width of each of the bars. A two-dimensional barcode may display information corresponding to a plurality of dots arranged in a plane.

A barcode recognition apparatus may be used to obtain information from a barcode. The barcode recognition apparatus may identify the shape (or other characteristics) of a barcode, read information from the identified shape of the barcode, and provide the read information to a user.

It is recognized that a conventional barcode attached to or formed on a product may be damaged while the product is being handled. If the barcode is rubbed or contacts a corrosive material when handled, the barcode may be damaged by abrasion or corrosion. Damage done to the barcode may reduce the recognition rate of the barcode. For example, a barcode formed on a deposition mask may be corroded and worn out when the deposition mask is being cleaned, which may result in a reduction in the recognition rate of the barcode. When the recognition rate of the barcode is reduced, a new barcode may be attached to or formed on the deposition mask. In other instances, the deposition mask may be discarded. As such, a process using the deposition mask may be delayed and additional costs may be incurred. This may, in turn, increase the cost of product(s) manufactured utilizing the deposition mask.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a method and apparatus for recognizing a barcode of a deposition mask that may improve a barcode recognition rate, may extend the life of a deposition mask by improving a recognition rate of a barcode formed on the deposition mask, and may effectively identify a barcode even if the barcode is damaged.

Additional aspects will be set forth in the detailed description which follows and, in part, will be apparent from the disclosure, or may be learned by practice of the invention.

According to exemplary embodiments, a method of recognizing a barcode of a deposition mask includes: receiving a barcode image corresponding to the barcode, the barcode image being associated with a lighting environment; determining that the barcode image is not recognizable; generating, in response to determining that the barcode image is not recognizable, one or more control signals configured to modify the lighting environment; and causing, at least in part, a second barcode image to be generated in association with a modified lighting environment.

According to exemplary embodiments, a method of recognizing a barcode of a deposition mask includes: causing, at least in part, the barcode to be photographed in association with a plurality of lighting environments; receiving a corresponding plurality of digital barcode images; determining which of the corresponding plurality of digital barcode images is associated with the highest recognition rate; and performing a recognition operation on the digital barcode image with the highest recognition rate.

According to exemplary embodiments, an apparatus for recognizing a barcode of a deposition mask includes: a photographing unit configured to generate, in association with a lighting environment, an image of the barcode; at least one light emitting unit configured to illuminate the barcode according to the lighting environment; and a recognition unit configured to determine whether the image is recognizable. In response to a determination that the image is not recognizable, the recognition unit is further configured to: generate a first control signal to modify the lighting environment; and generate a second control signal to cause the barcode to be re-imaged in association with a modified lighting environment.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
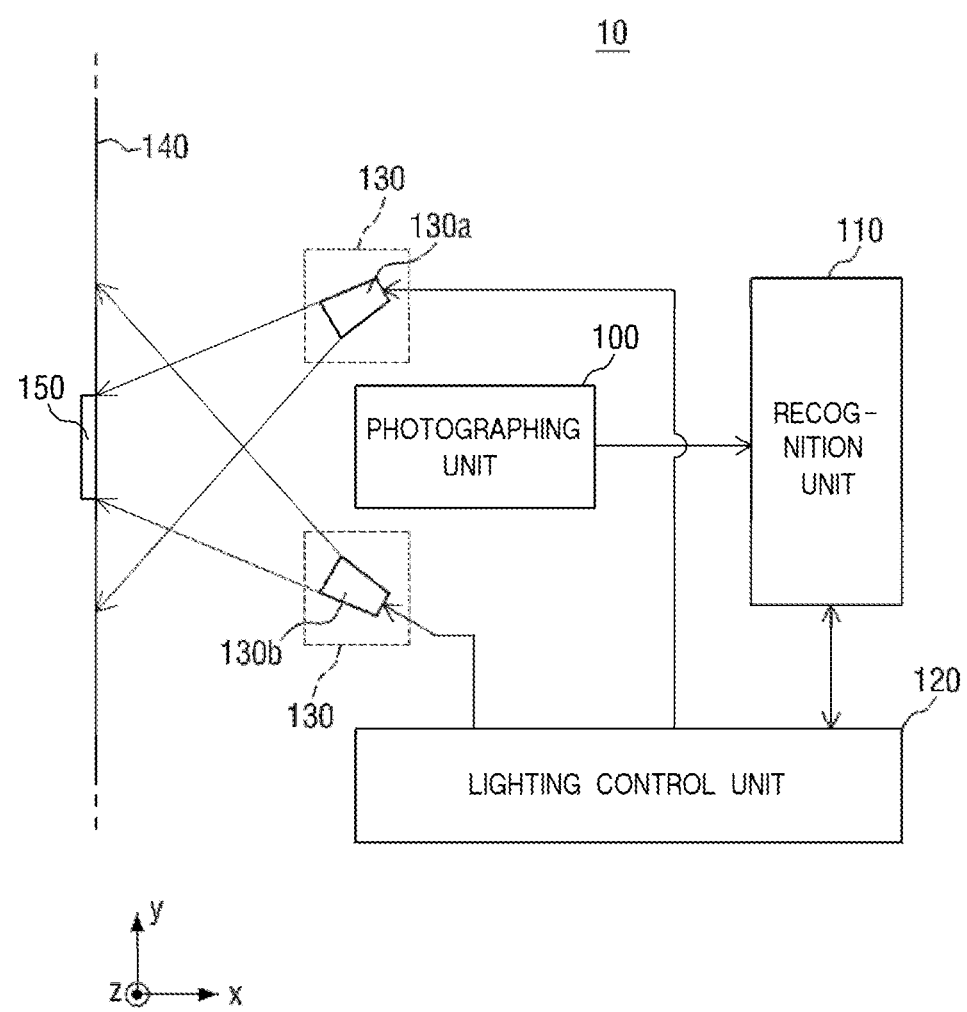
FIG. 1 is a block diagram of an apparatus for recognizing a deposition mask and a barcode of the deposition mask, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of an apparatus 10 for recognizing a deposition mask 140 and a barcode 150 of the deposition mask 140, according to exemplary embodiments.

Referring to FIG. 1, the barcode recognition apparatus 10 includes a photographing unit 100, a recognition unit 110, a lighting control unit 120, and one or more lighting units 130. Although specific reference will be made to this particular implementation, it is also contemplated that the barcode recognition apparatus 10 may embody many forms and include multiple and/or alternative components. For example, it is contemplated that the components of the barcode recognition apparatus 10 may be combined, located in separate structures, and/or separate locations.

According to exemplary embodiments, the photographing unit 100 may be placed at a determined distance from the deposition mask 140 and may be placed to face a barcode 150 of the deposition mask 140. The photographing unit 100 may generate a barcode image B by taking a photograph of the barcode 150. The barcode image B generated by the photographing unit 100 may be sent to the recognition unit 110. It is noted that the photographing unit is described in more detail in association with FIG. 4.

The recognition unit 110 may receive and store the barcode image B and "recognize" the barcode image B. The recognition unit 110 may recognize the barcode image B through a barcode image recognition process, which will be described later. When failing to recognize the barcode image B, the recognition unit 110 may transmit a signal instructing a change in a lighting environment to the lighting control unit 120 to enable the barcode 150 to be re-generated in association with the changed lighting environment. The recognition unit is described in more detail in association with FIG. 5.

According to exemplary embodiments, the lighting control unit 120 may change one or more settings of the lighting unit 130 in response to the signal instructing a change in the lighting environment that is received from the recognition unit 110. The changed lighting environment may correspond to any one of one or more lighting environments stored in a memory (not shown) of or associated with the lighting control unit 120. The changed lighting environment may change a pattern of light and shade created on the barcode 150, which will be described later. It is also contemplated that one or more factors affecting brightness, color, temperature, etc., may also be changed by the lighting control unit 120. As such, when failing to recognize the barcode image B, the barcode recognition apparatus 10 may retake a photograph of the barcode 150 in association with the changed lighting environment. Since the barcode recognition apparatus 10 may reattempt to recognize the barcode 150 by taking another photograph of the barcode 150 in a new (or otherwise changed) lighting environment, a recognition rate of the barcode 150 by the barcode recognition apparatus 10 may be increased. It is noted that the lighting control unit 120 is described in more detail in association with FIG. 6.

In exemplary embodiments, the lighting unit 130 may include a first lamp 130*a*, a second lamp 130*b*, a third lamp 130*c*, and a fourth lamp 130*d*. It is noted that the third lamp 130*c* and the fourth lamp 130*d* are not illustrated in FIG. 1, but are described in association with FIGS. 7 and 8. The first lamp 130*a* and the second lamp 130*b* may be separated from the deposition mask 140 and may be placed around (or about) the photographing unit 100 to illuminate the barcode 150. The same may be true of the third lamp 130*c* and the fourth lamp 130*d*. In this manner, one or more of the first lamp 130*a*, the second lamp 130*b*, the third lamp 130*c*, and the fourth lamp 130*d* may illuminate the barcode 150 based on one or more lighting environment settings. The one or more lighting environment settings may be stored in any suitable memory of or associated with apparatus 10. The lighting unit 130 is described in more detail in association with FIGS. 7 and 8.

The deposition mask 140 may be used in a deposition process, and, as such, the deposition mask 140 may include an opening used to form a pattern via one or more deposition processes. The barcode 150 may be disposed on a surface of the deposition mask 140. The barcode 150 may be, for example, embossed or engraved on the surface of the deposition mask 140. It is contemplated, however, that the barcode 150 may be affixed or formed on or to the deposition mask 140 in any suitable manner.

According to exemplary embodiments, the barcode 150 may store or be associated with information about the type and history of the barcode 150, as well as any other suitable information. In exemplary embodiments, the barcode 150 may store or be associated with information about a pattern formed on the deposition mask 140, the number of uses of the deposition mask 140, the period of use of the deposition mask 140, etc. The barcode recognition apparatus 10 may identify the shape (or other characteristic) of the barcode 150, read information contained in the barcode 150 from the identified shape of the barcode 150, and provide the read information to a user and/or system configured to, for instance, control at least one aspect of a deposition process utilizing the deposition mask 140. It is also contemplated that the barcode recognition apparatus 10 may identify the shape (or other characteristic) of the barcode 150, retrieve information associated with the identified shape of the barcode 150, and provide the retrieved information to the aforementioned user and/or system. For instance, recognition of the barcode 150 may be utilized to retrieve other information to control one or more aspects of a deposition process utilizing the deposition mask 140. It is noted that the barcode 150 is described in more detail in association with FIGS. 2 and 3.

Although exemplary embodiments are described in association with examples in which an object on which the barcode 150 is formed is a deposition mask 140, it is contemplated that the barcode 150 may be utilized in association with any other suitable product or process. It is noted that when the barcode 150 is utilized in association with other products/processes, the barcode recognition apparatus 10 may function in substantially the same manner as described herein.

In exemplary embodiments, the photographing unit 100, the recognition unit 110, the lighting control unit 120, the lighting unit 130, and/or one or more components thereof, may include or be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. Additional components of the photographing unit 100, the recognition unit 110, the lighting control unit 120, and the lighting unit 130 are described in more detail in association with FIGS. 4-8.

According to exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the photographing unit 100, the recognition unit 110, the lighting control unit 120, the lighting unit 130, and/or one or more components thereof may include or otherwise be associated with one or more memories (not shown) including code (e.g., instructions) configured to cause the photographing unit 100, the recognition unit 110, the lighting control unit 120, the lighting unit 130, and/or one or more components thereof to perform one or more of the features, functions, processes, etc. described herein.

Although not illustrated in association with FIG. 1, the aforementioned memories may be any medium that participates in providing code/instructions to the one or more software, hardware, and/or firmware components for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 2:
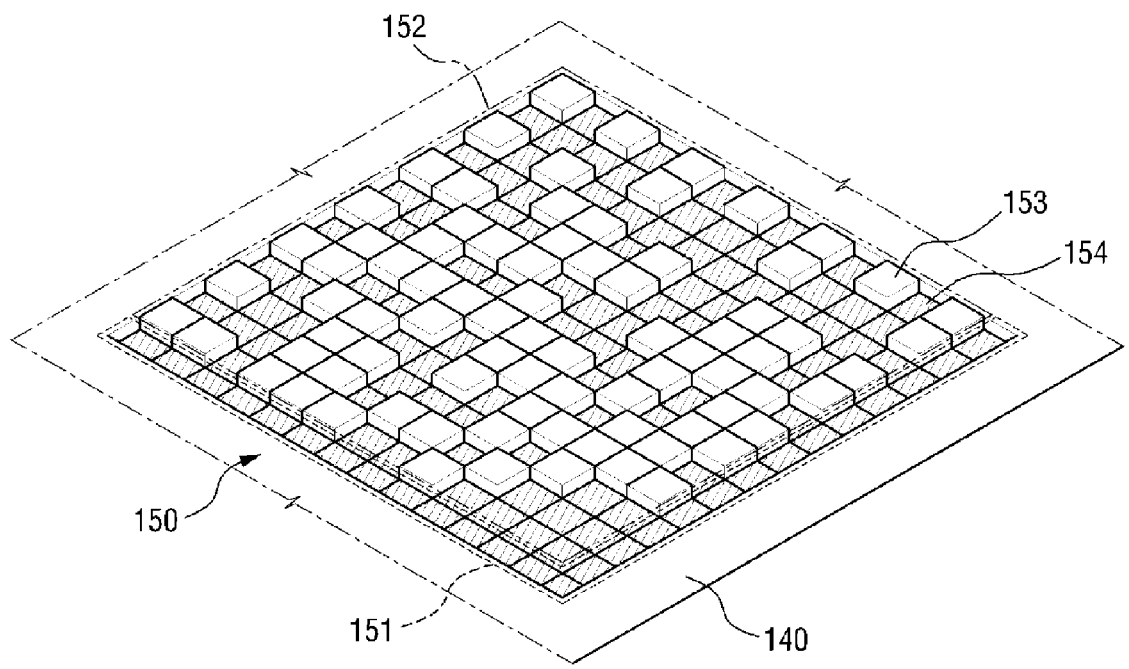
FIG. 2 is a perspective view of a barcode, according to exemplary embodiments.
Figure 3:
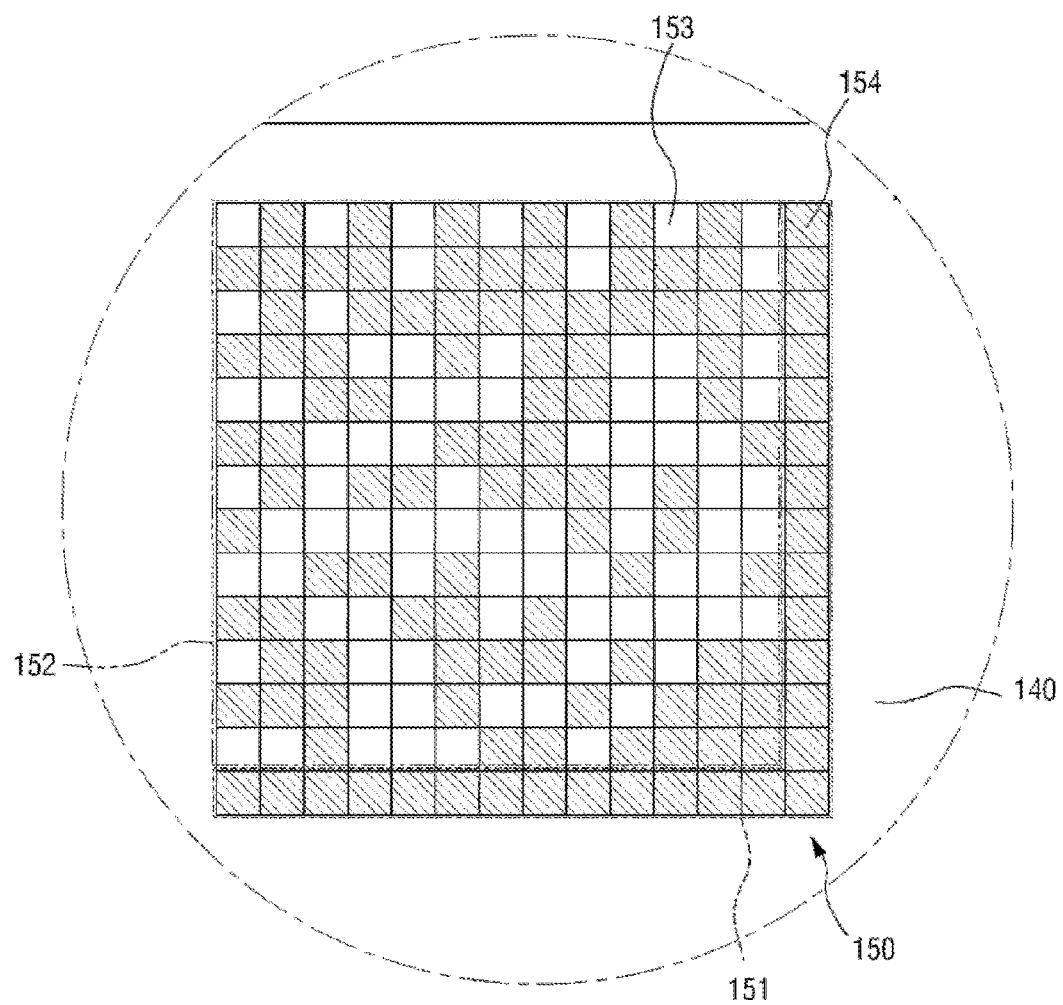
FIG. 3 is a plan view of the barcode of FIG. 2, according to exemplary embodiments.

FIG. 2 is a perspective view of the barcode 150, according to exemplary embodiments. FIG. 3 is a plan view of the barcode 150 of FIG. 2.

Referring to FIGS. 2 and 3, the deposition mask 140 may include an uneven barcode 150 (hereinafter barcode 150) embossed or engraved on a surface thereof. The barcode 150 may include a multi-dimensional (e.g., two-dimensional) matrix of first barcode regions 153 and second barcode regions 154. The first barcode regions 153 and the second barcode regions 154 may display (or otherwise be association with) different information. For example, each of the first barcode regions 153 may be recognized as a '1,' and each of the second barcode regions 154 may be recognized as a '0.' It is contemplated, however, that any other suitable coding technique may be utilized. To this end, it is also contemplated that any suitable number of different barcode regions may be utilized to convey (or otherwise be associated with) any suitable information.

As seen in FIGS. 2 and 3, the barcode 150 includes a pattern of the first barcode regions 153 and the second barcode regions 154. The information conveyed by the pattern of the first barcode regions and/or the second barcode regions 154 may relate to the type and history of the deposition mask 140; however, any other suitable information may conveyed via the barcode 150. As previously mentioned, the various forms of information may be stored in the pattern or may be retrieved based on identification of the pattern. When the information is stored in association with the pattern, the information may be updated, such as, in accordance with, the changing history, use, etc., of the deposition mask 150.

Each of the first and second barcode regions 153 and 154 may be shaped in any suitable geometric configuration, e.g., shaped as a quadrangle, for example, a square, rectangle, etc. The first barcode regions 153 and the second barcode regions 154 may have, but are not limited to, the same size and shape. In FIGS. 2 and 3, the barcode 150 includes a 14×14 array of the first barcode regions 153 and the second barcode regions 154. This configuration is merely an illustrative example. That is, the barcode 150 may include any suitable number of the first and second barcode regions 153 and 154, which may be arranged in any suitable manner.

According to exemplary embodiments, the first barcode regions 153 and the second barcode regions 154 may be distinguished by their relative protruding lengths from a surface of the deposition mask 140 and/or the barcode 150. For instance, the first barcode regions 153 may protrude more than the second barcode regions 154, and the second barcode regions 154 may be recessed more than the first barcode regions 153. The first barcode regions 153 and the second barcode regions 154 may be formed by embossing or engraving the surface of the deposition mask 140. It is also contemplated that one of the first and second barcode regions 153 and 154 may be engraved or embossed, and, as such, define another one of the first and second barcode regions 153 and 154. For example, the second barcode regions 154 may be recessed from a surface of the barcode 150. In this manner, the first barcode regions 153 may be coplanar with the surface of the barcode 150, such that in a region including barcode 150, the first barcode regions 153 may be defined in respective portions where the second barcode regions 154 are not formed. It is also contemplated that one or more of the first and second barcode regions 153 and 154 may be formed by depositing material onto a surface of the deposition mask 140. The deposited material may be patterned. It is further noted that one or more aspects of the first and second barcode regions 153 and 154 may be distinguished from one another to affect the generation of light and shade regions utilized to identify the first and second barcode regions 153 and 154. The one or more aspects may include, for example, surface texture, material, color, transmissivity, reflectivity, and/or the like.

In exemplary embodiments, the barcode recognition apparatus 10 may identify the first barcode regions 153 and the second barcode regions 154 by recognizing (or otherwise detecting) a pattern of light and shade regions created by light provided to and, thereby, reflected off the first barcode regions 153 and the second barcode regions 154. Since the state of the pattern of light and shade regions can vary according to the lighting environment of the lighting unit 130, the recognition rate of the first barcode regions 153 and the second barcode regions 154 by the barcode recognition apparatus 10 may also vary. As will become more apparent below, variance of the lighting environment may be utilized to increase a recognition rate of the barcode 150 by the barcode recognition apparatus 10.

As seen in FIGS. 2 and 3, the barcode 150 may be divided into a finder region 151 and a data region 152. Referring to FIG. 3, the finder region 151 may be an outermost region of the barcode 150 that is disposed at a side of the barcode 150 and another side adjacent to the side. The finder region 151 may only include the second barcode regions 154. In FIG. 3, the finder region 151 only includes the second barcode regions 154 disposed along some of the boundary of the barcode 150. It is contemplated, however, that the finder region 151 may include only the second barcode regions 154 disposed along the entire boundary of the barcode 150. It is also contemplated that, in exemplary embodiments, the finder region 151 may include only the first barcode regions 153, which may be disposed along some or all of the boundary of the barcode 150. Since the finder region 151 is formed on the outermost periphery of the barcode 150 and includes either of the first barcode regions 153 and the second barcode regions 154, it may be easily recognized by the barcode recognition apparatus 10. It is also contemplated that the finder region 151 may include a designated pattern of first and/or second barcode regions 153 and 154, such as an alternating pattern of the first and/or second barcode regions 153 and 154. To this end, the finder region 151 may be disposed in any suitable portion of the barcode 150, such as a center portion of the barcode 150, etc. In this manner, the barcode recognition apparatus 10 may easily determine whether a target object is a barcode 150 region or some other portion of the deposition mask 140. As previously mentioned, exemplary embodiments may include the finder region 151 surrounding the outermost periphery of the barcode 150.

The data region 152 may be a region of the barcode 150 excluding the finder region 151, and may include information or may be associated with information that may be retrieved based on identifying the first and/or second barcode regions 153 and 154 and/or identifying a pattern of the first and/or second barcode regions 153 and 154. The data region 152 may include an identification (ID) region (not shown). The ID region may include information about the encoding type and algorithm of data recorded in the data region 152, the data volume or size of the barcode 150, etc. The ID region may exist as a determined pattern at a determined location, so that the barcode recognition apparatus 10 can recognize the ID region. The data region 152, excluding the ID region, may include information about the deposition mask 140. It is further noted that identification of the ID region may be utilized to retrieve the above-noted information of or associated with the barcode 150 and/or deposition mask 140.

Figure 4:
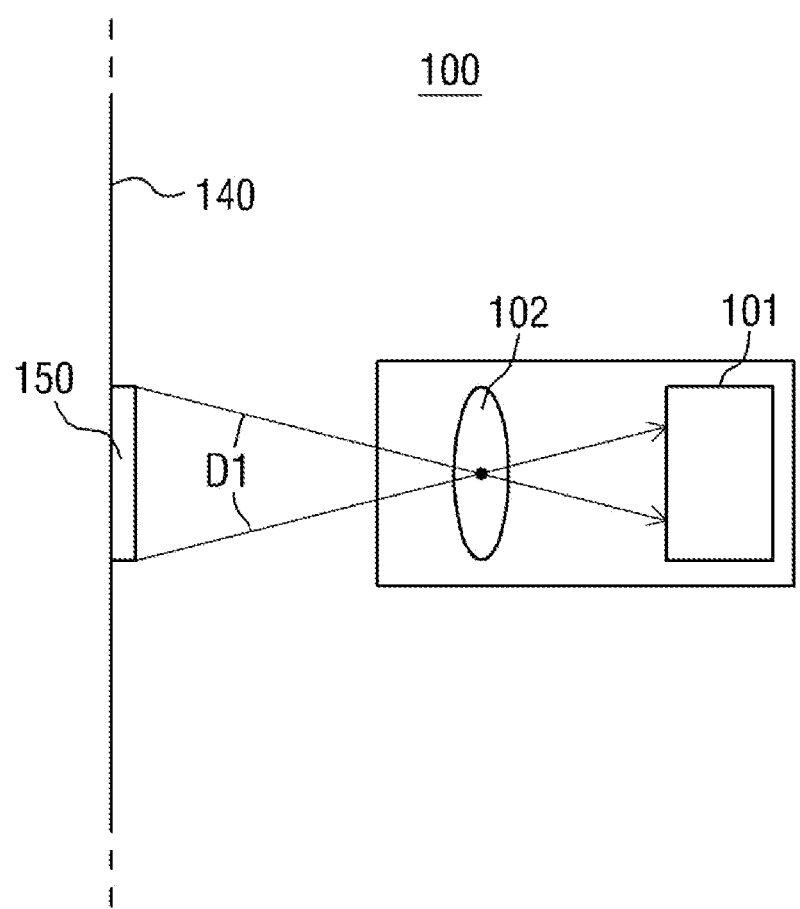
FIG. 4 is a block diagram of a photographing unit, according to exemplary embodiments.

FIG. 4 is a diagram of the photographing unit 100, according to exemplary embodiments.

Referring to FIG. 4, the photographing unit 100 may include an image lens 102 and an image sensor 101.

With continued reference to FIG. 1, light emitted from the lighting unit 130 and reflected by the barcode 150 may propagate in a first direction D1 to, thereby, enter the photographing unit 100. Light received by the photographing unit 100 may pass through the image lens 102 (e.g., a central region of the image lens 102) to form an inverted image of the barcode 150 on the image sensor 101.

According to exemplary embodiments, the image lens 102 may concentrate light entering the photographing unit 100 and pass the concentrated light to the image sensor 101. The image lens 102 may include a lens tube, a plurality of condensing lenses housed in the lens tube, and/or any other suitable component to facilitate photographing (or imaging) of the barcode 150. In this manner, the image sensor 101 may receive light from the image lens 102. In addition, an analog-to-digital (A/D) converter (not shown) included in or accessible to the image sensor 101 may generate a corresponding barcode image by converting the received light in an analog form into a digital signal. The generated barcode image (or electrical signal) may be compressed and provided to the recognition unit 110.

In exemplary embodiments, the image sensor 101 may be a line sensor including an array (e.g., a one-dimensional array) of solid-state image pickup devices, such as, for example, one or more complementary metal oxide semiconductors (CMOS) or charge coupled device (CCD) cameras. It is also contemplated that the image sensor 101 may be an area sensor including a multi-dimensional (e.g., a two-dimensional) array of solid-state image pickup devices, such as one or more CMOSs or CCD cameras. It is noted, however, that any other suitable photographing/imaging device may be utilized.

Figure 5:
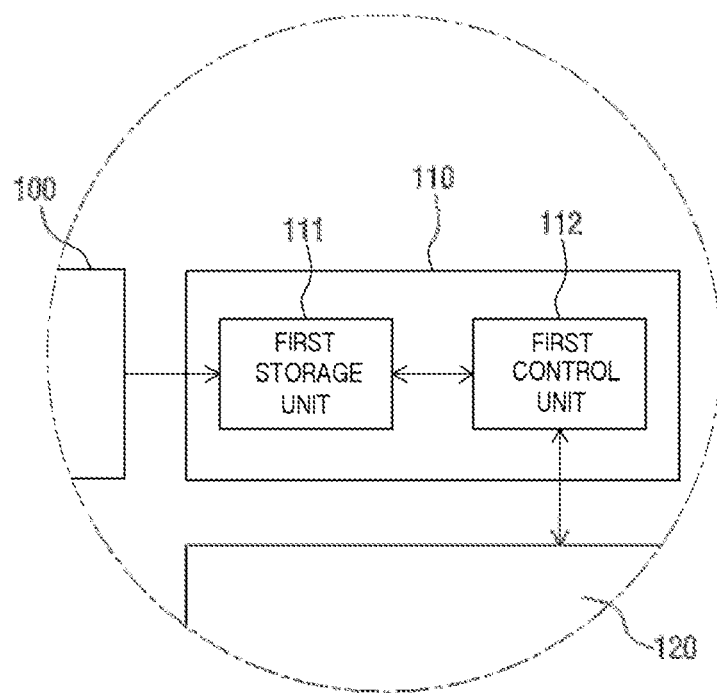
FIG. 5 is a block diagram of a recognition unit, according to exemplary embodiments.

FIG. 5 is a block diagram of the recognition unit 110, according to exemplary embodiments.

Referring to FIG. 5, the recognition unit 110 may include a first storage unit 111 and a first control unit 112.

The first storage unit 111 may be any suitable memory device, such as, for example, one or more of the aforementioned memories previously described; however, any other suitable memory or storage device may be utilized. The first storage unit 111 may store the barcode image B received from the photographing unit 100. The first storage unit 111 may further include a processing region to perform arithmetic operations and/or logic operations and a reading condition table region. The first storage unit 111 may further store various types of image processing programs for recognizing the barcode image B.

The first control unit 112 may include a central processing unit (CPU), a system bus (not shown), and input and output interfaces (not illustrated). In this manner, the first control unit 112 may include or be implemented by one or more of the aforementioned general purpose and/or special purpose components, which may be configured to control the recognition unit 110, and, thereby, provide an information processing function. To this end, the first control unit 112 may perform a recognition process on the barcode image B. For instance, the first control unit 112 may recognize the finder region 151 in the barcode image B to identify the existence of barcode 150. The first control unit 112 may recognize the ID region included in the data region 152. The first control unit 112 may obtain information about the data encoding type and algorithm of the barcode 150 by recognizing the ID region and obtain information about the deposition mask 140 by recognizing the information of the data region 152 or may retrieve information about or associated with the deposition mask 140 by recognizing the ID region and utilizing information corresponding to the ID region to retrieve information from at least one storage location. The first control unit 112 may provide the information about the deposition mask 140 to the above-noted user and/or system.

When failing to recognize the finder region 151 and the data region 152, the first control unit 112 may transmit one or more signals instructing at least one change in one or more lighting environment settings to the lighting control unit 120. To this end, the first control unit 112 may send one or more commands to the photographing unit 100 to instruct the photographing unit 100 to re-photograph (or otherwise re-image) the barcode 150 in association with the changed lighting environment setting(s). When the lighting environment setting(s) is changed, the recognition rate of the first barcode regions 153 and the second barcode regions 154 may also be changed. As such, the barcode 150 that was previously unrecognizable by the barcode recognition apparatus 10 based on one or more first lighting environment settings may be subsequently recognized when imaged utilizing one or more second (or changed) lighting environment settings. This may improve the barcode recognition rate of the barcode recognition apparatus 10.

Figure 6:
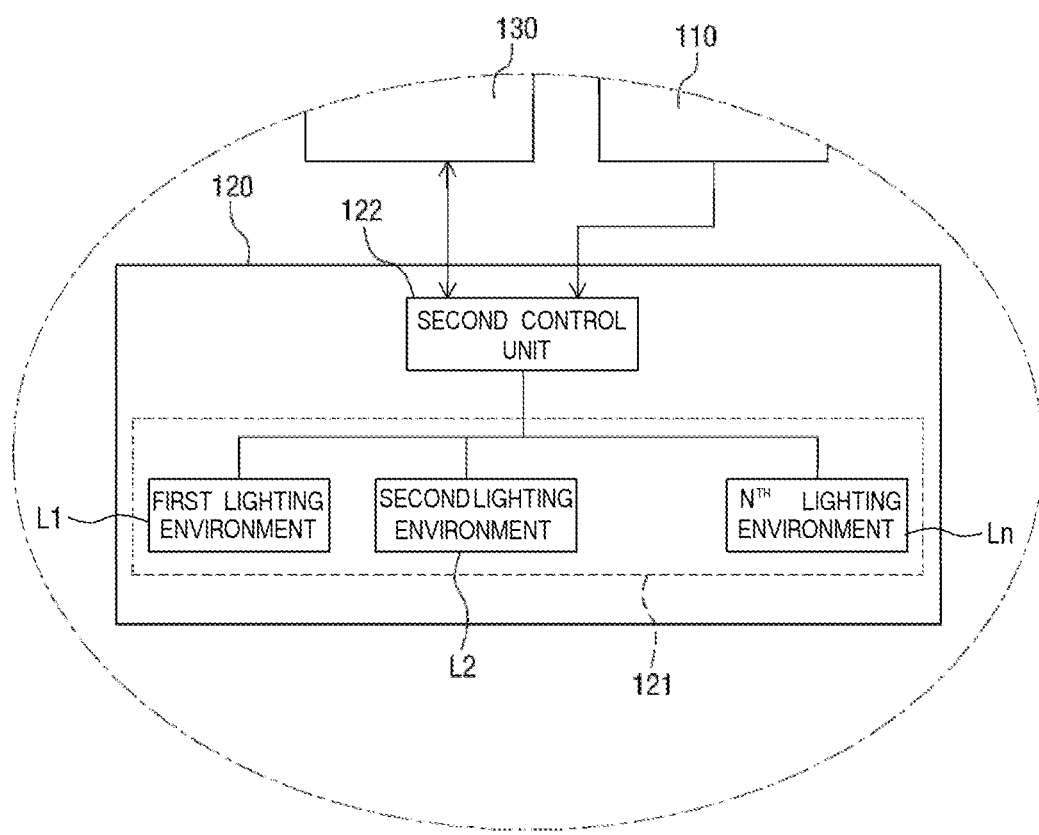
FIG. 6 is a block diagram of a lighting control unit, according to exemplary embodiments.

FIG. 6 is a block diagram of the lighting control unit 120, according to exemplary embodiments.

Referring to FIG. 6, the lighting control unit 120 may include a second storage unit 121 and a second control unit 122.

The second storage unit 121 may be any suitable memory device, such as, for example, one or more of the aforementioned memories previously described; however, any other suitable memory or storage device may be utilized. The second storage unit 121 may store first through $n^{th}$ lighting environments L1 through Ln, where "n" is a natural number greater than zero. The first through $n^{th}$ lighting environments L1 through Ln may correspond respectively to a plurality of lighting settings of the lighting unit 130, which will be described later.

The second control unit 122 may be connected to the first control unit 112 and the first through fourth lamps 130a through 130d included in the lighting unit 130. The second control unit 122 may include a central processing unit (CPU), a system bus (not shown), and input and output interfaces (not illustrated). In this manner, the second control unit 122 may include or be implemented by one or more of the aforementioned general purpose and/or special purpose components.

According to exemplary embodiments, the second control unit 122 may receive one or more signals instructing at least one change in one or more lighting environment settings from the first control unit 112. In this manner, the second control unit 122 may load one of the first through $n^{th}$ lighting environments L1 through Ln stored, for example, in the second storage unit 121 in response to the one or more signals instructing at least one change in one or more lighting environment settings being received. The second control unit 122 may change the lighting setting(s) of the lighting unit 130 according to the loaded lighting environment. A change in the lighting environment setting may lead to a change in the degree of recognition of the first barcode regions 153 and the second barcode regions 154. In this manner, a barcode image B generated in association with the changed lighting environment may be different from the previous barcode image B and may be recognized to a different degree from the previous barcode image B by the barcode recognition apparatus 10.

Figure 7:
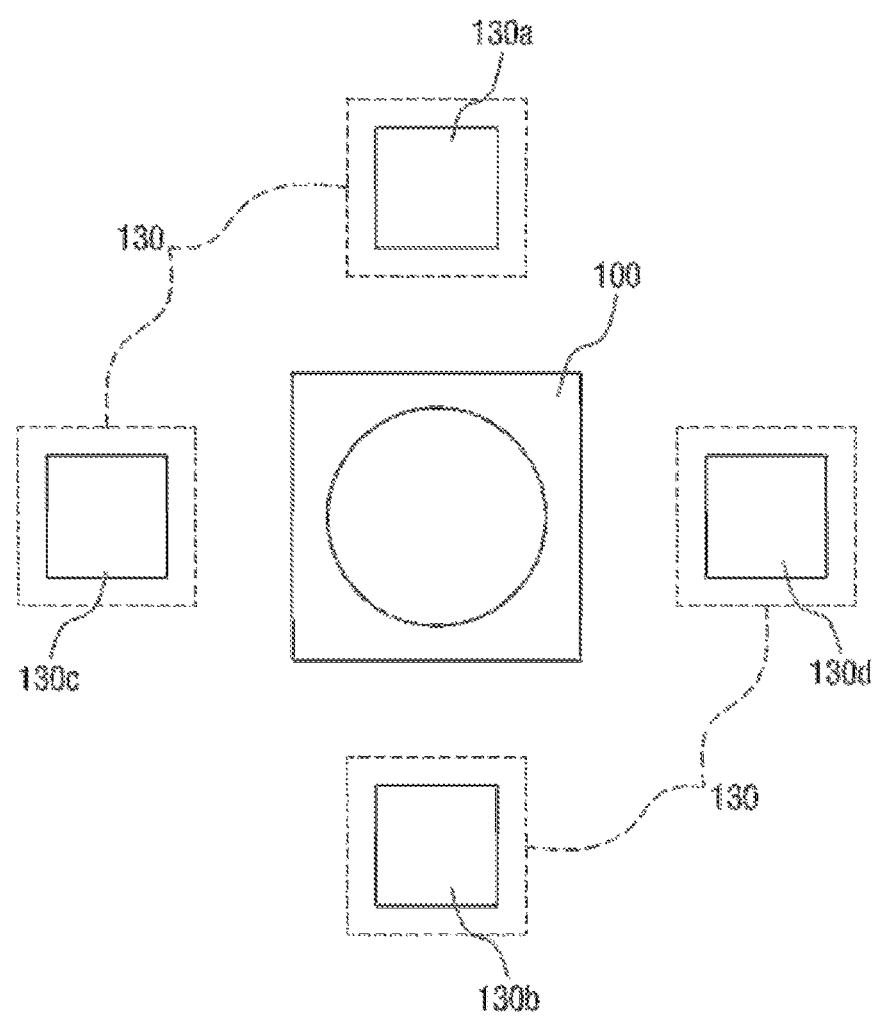
FIG. 7 is a block diagram of a lighting unit and a photographing unit, according to exemplary embodiments.

FIG. 7 is a block diagram of the lighting unit 130 and the photographing unit 100, according to exemplary embodiments.

Referring to FIG. 7, the lighting unit 130 may include the first lamp 130a, the second lamp 130b, the third lamp 130c, and the fourth lamp 130d. The first through fourth lamps 130a through 130d may be spaced from the photographing unit 100, such as spaced from the photographing unit 100 at equal distances. To this end, the first through fourth lamps 130a through 130d may be disposed about the photographing unit 100, such as disposed about the photographing unit at intervals of 90 degrees. It is contemplated, however, that the disposition and number of lamps may be varied.

According to exemplary embodiments, the first through fourth lamps 130a through 130d may provide a light source to photograph the barcode 150, and, thereby, enable a contrasting pattern of light and shade regions to be disposed on the embossed or engraved regions of the barcode 150. In this manner, the recognition unit 110 may more easily distinguish the first barcode regions 153 from the second barcode regions 154 based on the lighting conditions provided via the number and arrangement of lamps (e.g., lamps 130a-130d) of the lighting unit 130. Although not shown, the lighting unit 130 may further include one or more barriers to block and/or redirect at least some of the light radiating from at least one of the lamps 130a-130d and/or reflecting off of the barcode 150. In this manner, light may be prevented from directly entering the photographing unit 100.

The first through fourth lamps 130a through 130d may be light-emitting diodes (LEDs); however, any other suitable light source may be utilized. In exemplary embodiments, the LEDs may emit visible light having a wavelength (or range of wavelengths) of or between 380 nm and 750 nm or infrared light having a wavelength (or range of wavelengths of 750 nm or more. The first through fourth lamps 130a through 130d may be configured to emit the same wavelength or different wavelengths of light.

Figure 8:
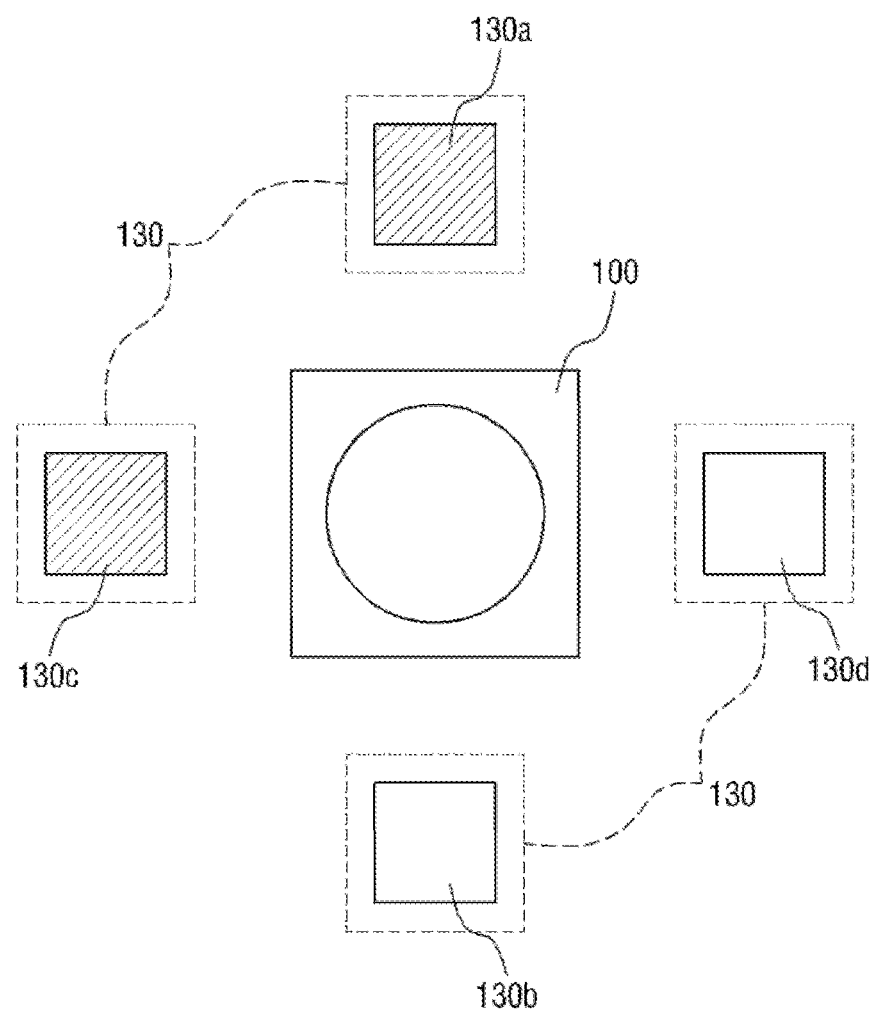
FIG. 8 is a block diagram of a lighting environment of a barcode recognition apparatus, according to exemplary embodiments.

FIG. 8 is a block diagram of a lighting environment of the barcode recognition apparatus 10, according to exemplary embodiments.

Referring to FIG. 8, the first lamp 130a and the third lamp 130c may be turned off, unlike in FIG. 7, where each of the first through fourth lamps 130a through 130d may be turned on. The second control unit 122 may change the lighting environment of the lighting unit 130 by turning on or off one or more of the first through fourth lamps 130a through 130d of the lighting unit 130. It is also contemplated that the second control unit 122 may adjust the spatial positioning of one or more of the first through fourth lamps 130a through 130d, such as the spacing from photographing unit 100, spacing about the photographing unit 100, angular direction, blocked state, etc. The changed lighting environment may correspond to one of the first through $n^{th}$ lighting environments L1 through Ln stored in the second storage unit 121 or one or more lighting environment settings corresponding to one of the first through $n^{th}$ lighting environments L1 through Ln.

When the on/off state of each of the first through fourth lamps 130a through 130d is changed, luminance of light in each region of the barcode 150 provided with light and the state of light and shade patterns of the barcode 150 may be changed. In this manner, even if the barcode image B captured in a first lighting environment is not recognized by the recognition unit 110, a barcode image B captured in a second lighting environment changed by changing, for example, the on/off state of at least one of the first through fourth lamps 130a through 130d can be recognized by the recognition unit 110. Since the barcode recognition apparatus 10 performs a photographing operation by changing the on/off state of at least one of the first through fourth lamps 130a through 130d, a barcode recognition rate may be improved.

It is noted that relative degree of protruding and recessed shapes of the embossed or engraved barcode 150 may be changed by abrasion and damage during a cleaning process or use of the deposition mask 140. As such, the first barcode regions 153 and the second barcode regions 154 may not be clearly distinguished from each other over time. As such, if the deposition mask 140 is cleaned repeatedly, the barcode 150 of the deposition mask 140 may be worn down, thereby reducing the barcode recognition rate of the barcode recognition apparatus 10. However, even if the barcode 150 is worn down, the barcode recognition apparatus 10 according to exemplary embodiments may improve its barcode recognition rate by changing one or more of the lighting environment settings to affect the manner in which light and shade regions are produced when the barcode 150 is illuminated via the lighting unit 130. As such, exemplary embodiments enable prevention of processing delays and errors caused, at least in part, by a barcode recognition error, as well as reduce the inconvenience of forming a new barcode 150 or even a new deposition mask 140. Furthermore, since even the worn-down barcode 150 can be recognized, it may be possible to prevent the deposition mask 140 from being discarded due to the abrasion of the barcode 150. As a result, the life of the deposition mask 140 may be extended.

According to exemplary embodiments, the second control unit 122 may change one or more aspects of the lighting environment of the lighting unit 130 by changing the luminance of at least one of the first through fourth lamps 130a through 130d. The changed lighting environment may correspond to one of the first through $n^{th}$ lighting environments L1 through Ln stored in the second storage unit 121 or one or more environment lighting settings corresponding to one of the first through $n^{th}$ lighting environments L1 through Ln. When the luminance of at least one of the first through fourth lamps 130a through 130d is changed, luminance of light in various regions of the barcode 150 provided with the light and the state of a light and shade pattern of the barcode 150 may also be changed. As such, even if the barcode image B captured in association with a first lighting environment is not recognized by the recognition unit 110, a barcode image B captured in association with a second lighting environment changed by changing the luminance of at least one of the first through fourth lamps 130a through 130d may be recognized by the recognition unit 110. Since the barcode recognition apparatus 10 may perform a photographing operation by changing the luminance of at least one of the first through fourth lamps 130a through 130d, the barcode recognition rate may be improved. The improved barcode recognition rate may prevent the barcode 150 from being not recognized due to the abrasion of the barcode 150 and prevent the deposition mask 140 from being discarded due to the abrasion of the barcode 150. As a result, the life of the deposition mask 140 may be extended.

Figure 9:
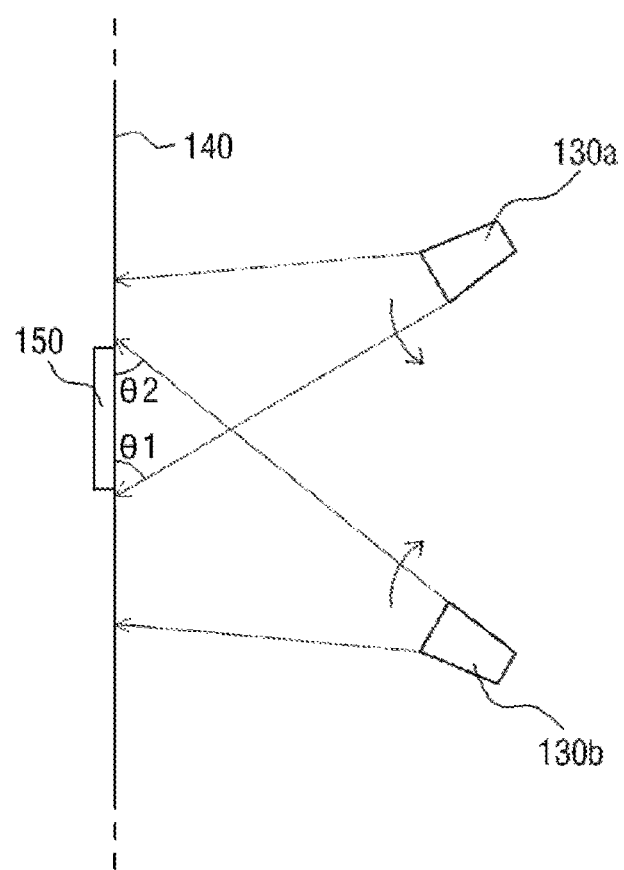
FIG. 9 is a block diagram of a lighting environment of a barcode recognition apparatus, according to exemplary embodiments.

FIG. 9 is a block diagram of a lighting environment of the barcode recognition apparatus 10, according to exemplary embodiments.

Referring to FIG. 9, the second control unit 122 may change the lighting environment of the lighting unit 130 by changing a first angle θ1 formed by light emitted from the first lamp 130a and the barcode 150 or a second angle θ2 formed by light emitted from the second lamp 130b and the barcode 150. The changed lighting environment may correspond to one of the first through $n^{th}$ lighting environments L1 through Ln stored in the second storage unit 121 or any other suitable memory of or accessible to the barcode recognition apparatus 10. The first angle θ1 and the second angle θ2 may be changed by rotating the first lamp 130a and the second lamp 130b and/or translating the first lamp 130a and the second lamp 130b in one or more directions. Although not shown in FIG. 9, angles formed by light emitted from the third and fourth lamps 130c and 130d and the barcode 150 may be changed according to a change in one or more lighting environment settings.

According to exemplary embodiments, the barcode recognition apparatus 10 may illuminate the barcode 150 at various angles by changing the first angle θ1 or the second angle θ2. When an angle formed by light emitted from one or more of the first through fourth lamps 130a through 130d and the barcode 150 is changed, luminance of the light in various regions of the barcode 150 provided with the light and the state of light and shade patterns of the barcode 150 may also be changed. As such, even if the barcode image B captured in association with a first lighting environment is not recognized by the recognition unit 110, a barcode image B captured in a second lighting environment changed by changing the angle formed by the light emitted from one or more of the first through fourth lamps 130a through 130d and the barcode 150 can be recognized by the recognition unit 110. Since the barcode recognition apparatus 10 may perform a photographing operation by changing the angle formed by light emitted from one or more of the first through fourth lamps 130a through 130d and the barcode 150, the barcode recognition rate may be improved. The improved barcode recognition rate may prevent the barcode 150 from being not recognized due to the abrasion of the barcode 150 and may prevent the deposition mask 140 from being discarded due to the abrasion of the barcode 150. As a result, the life of the deposition mask 140 can be extended.

Figure 10:
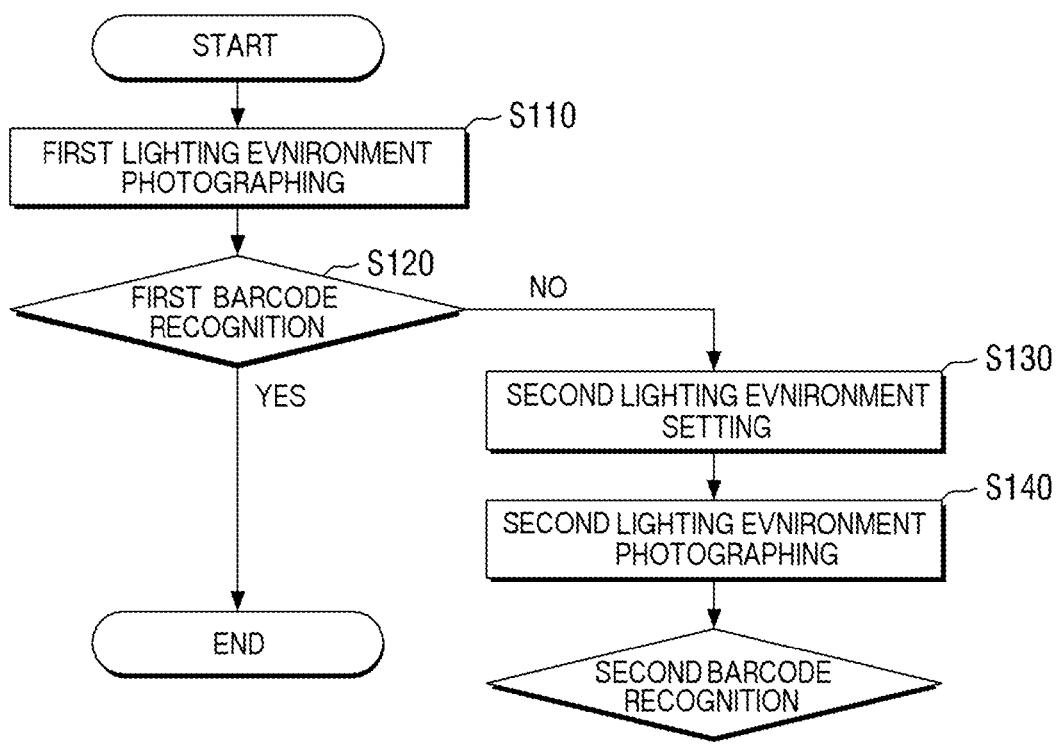
FIG. 10 is a flowchart of a method of recognizing a barcode of a deposition mask, according to exemplary embodiments.

FIG. 10 is a flowchart of a method of recognizing a barcode of a deposition mask, according to exemplary embodiments.

Referring to FIG. 10, the barcode recognition apparatus 10 performs a first lighting environment photographing operation (operation S110), a first barcode recognition operation (operation S120), a second lighting environment setting operation (operation S130), and a second lighting environment photographing operation (operation S140).

In the first lighting environment photographing operation (operation S110), the photographing unit 100 may take a photograph of a barcode 150 in association with a first lighting environment L1. The barcode 150 formed on the deposition mask 140 may be illuminated by a lighting unit 130 which is set (or otherwise configured) based on one or more light environment settings corresponding to the first lighting environment L1. The photographing unit 100 may be placed to face the barcode 150. Light reflected from the barcode 150 may proceed to the photographing unit 100, and an image lens 102 of the photographing unit 100 may collect the reflected light and send the collected light to an image sensor 101. The image sensor 101 may receive the collected light. In this manner, an A/D converter (not shown) of the image sensor 101 may generate a barcode image 160 by converting the light in an analog form into a digital signal.

Figure 11:
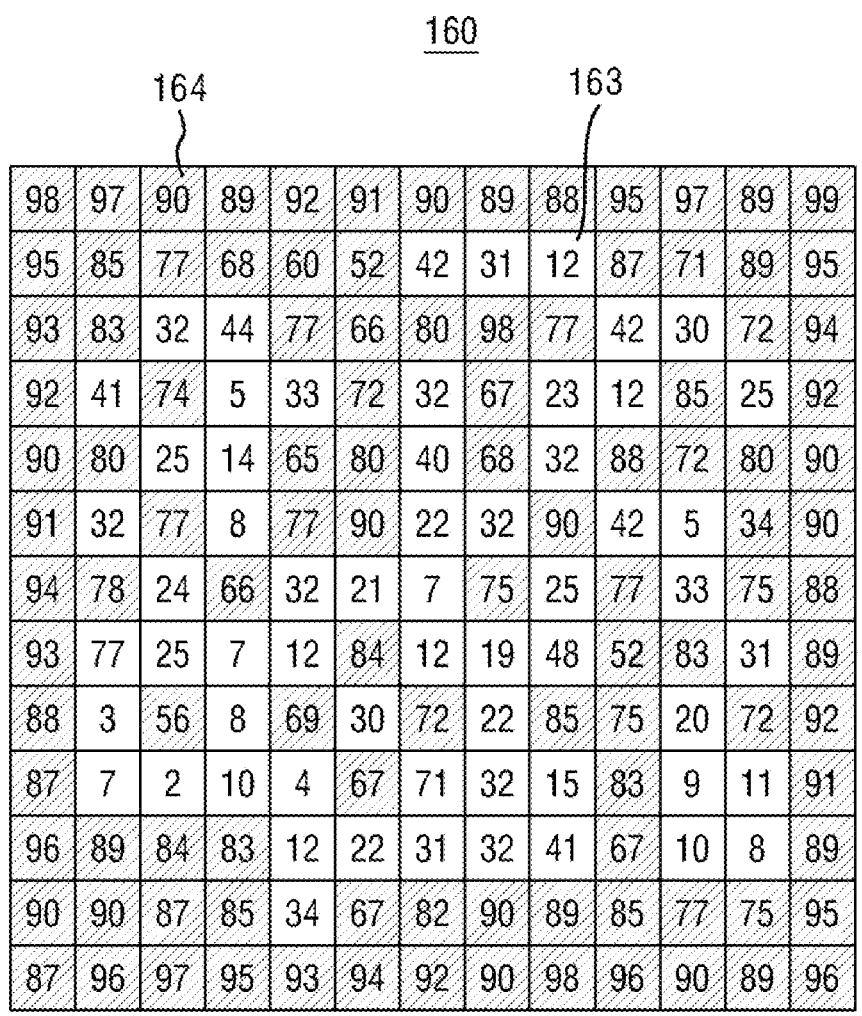
FIG. 11 is a diagram of a barcode image recognized in association with the barcode recognition method of FIG. 10, according to exemplary embodiments.

In the first barcode recognition operation (operation S120), a recognition unit 110 may recognize the barcode image 160, which is described in more detail in association with FIG. 11. The barcode image 160 converted by the image sensor 101 may be compressed and then sent to the recognition unit 110. The barcode image 160 sent to the recognition unit 110 may be stored in a first storage unit 111 and recognized by a first control unit 112. A barcode image recognition method that may be used by the recognition unit 110 will now be described in greater detail with reference to FIG. 11.

FIG. 11 is a diagram of a barcode image 160 recognized in association with the barcode recognition method of FIG. 10, according to exemplary embodiments.

Referring to FIG. 11, the barcode image 160 may be a numerical representation of brightness of each region of the barcode 150 which corresponds to a pattern of light and shade regions created on the barcode 150 based on the first lighting environment L1. The numeral representation may be achieved by quantifying the brightness of each region of the barcode 150 according to the pattern of light and shade regions created on the barcode 150 using a boundary determination program (or process) of the first control unit 112. A value allocated to each region of the barcode 150 may increase as the corresponding region of the barcode 150 becomes darker and decrease as the corresponding region of the barcode 150 becomes brighter. Exemplary embodiments, however, may utilize any suitable technique to recognize the various regions of the barcode 150. The barcode image 160 may include first regions 163 and second regions 164. The second regions 164 may be regions having values higher than a threshold value set by the boundary determination program, and the first regions 163 may be regions having values lower than the threshold value set by the boundary determination program. The threshold value set by the boundary determination program may be, for instance, 50. It is noted, however, that the threshold value may be any suitable value.

According to exemplary embodiments, the first control unit 112 may read information stored in the barcode 150 by recognizing regions determined to be the first regions 163 as first barcode regions 153 and recognizing regions determined to be the second regions 164 as second barcode regions 154. When the division between the first barcode regions 153 and the second barcode regions 154 is not clear due to, for instance, the abrasion or wearing of the barcode 150, the first barcode regions 153 may be determined to be the second regions 164, or the second barcode regions 154 may be determined to be the first regions 163. As such, the barcode 150 may not be recognized by the barcode recognition apparatus 10.

When recognizing the barcode image 160, the first control unit 112 may determine whether an object is the barcode 150 by detecting a finder region 161. Once recognizing the finder region 161, the first control unit 112 may recognize an ID region (not shown) within a data region 162. The first control unit 112 may obtain information about data encoding type, algorithm, data volume, etc. by recognizing the ID region. The first control unit 112 may obtain information about the deposition mask 140 by reading out the data region 162 based on the information obtained from the ID region. As previously mentioned, the first control unit 112 may obtain information about the deposition mask 140 by querying a storage device utilized information read from one or more of the ID region and the data region 162.

When failing to recognize the finder region 161 or the ID region, the first control unit 112 may transmit one or more signals instructing a change in one or more lighting environment settings to the lighting control unit 120. The finder region 161 or the ID region may not be recognized when a barcode image generation error occurs because, for instance, the first barcode regions 153 are determined to be the second regions 164 and/or the second barcode regions 154 are determined to be the first regions 163.

Referring back to FIG. 10, in the second lighting environment setting operation (operation S130), the lighting control unit 120 may set the lighting environment to a second lighting environment L2. A second control unit 122 may receive the one or more signals instructing a change in one or more lighting environment settings from the first control unit 112. In response to the signal(s), the second control unit 122 may change the lighting environment of the lighting unit 130 to the second lighting environment L2 stored in, for instance, the second storage unit 121.

The second lighting environment L2 may be different from the first lighting environment L1 in the on/off state of at least one of a plurality of lamps 130a through 130d, an angle of light emitted from at least one of the lamps 130a through 130d with respect to the barcode 150, or the luminance of at least one of the lamps 130a through 130d.

When the lighting environment is changed, luminance of light in various regions of the barcode 150 provided with the light and the state of a light and shade pattern of the barcode 150 may also be changed. As such, even if the barcode image 160 captured in association with the first lighting environment is not recognized by the recognition unit 110, a barcode image 160 captured in association with the second lighting environment may be recognized by the recognition unit 110. That is, when failing to recognize the barcode 150, the barcode recognition apparatus 10 may reattempt to recognize the barcode 150 by changing the lighting environment and photographing the barcode 150 again in association with the changed lighting environment. As such, the barcode recognition rate of the barcode recognition apparatus 10 may be improved. The improved barcode recognition rate may prevent the barcode 150 from being not recognized due to the abrasion, wear, etc. of the barcode 150 and may prevent the deposition mask 140 from being discarded due to the abrasion, wear, etc. of the barcode 150. In this manner, the life of the deposition mask 140 may be extended.

In the second lighting environment photographing operation (operation S140), the photographing unit 100 may take a photograph of the barcode 150 in association with the second lighting environment L2. According to exemplary embodiments, a distance between the deposition mask 140 and the photographing unit 100 and a method used to generate a subsequent barcode image may be substantially the same as those in the first or previous lighting environment photographing operation (operation S110).

Figure 12:
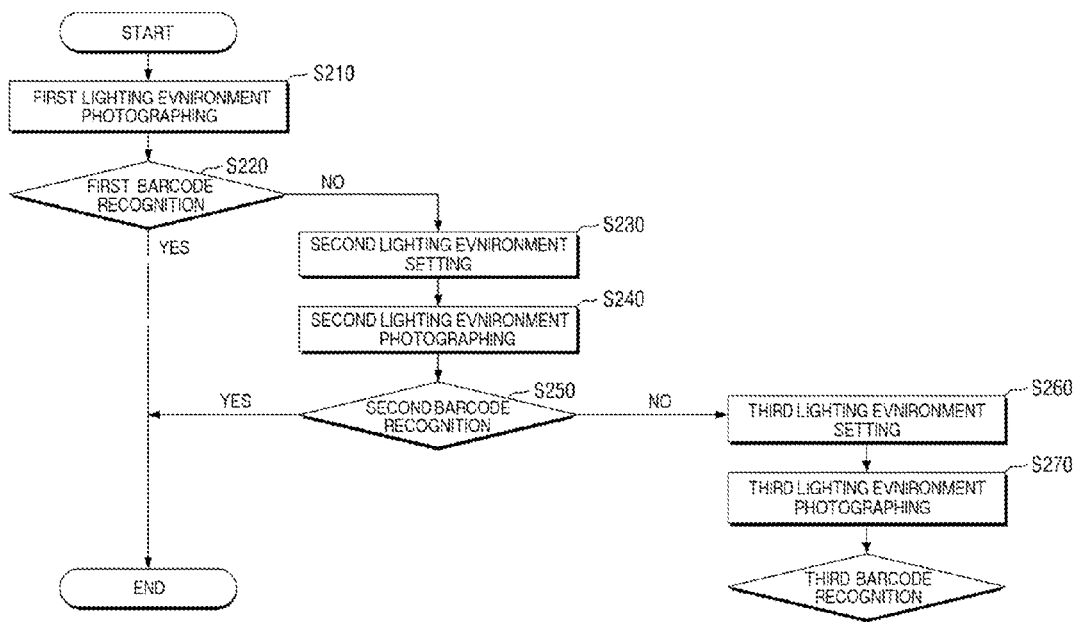
FIG. 12 is a flowchart of a method of recognizing a barcode of a deposition mask, according to exemplary embodiments.

FIG. 12 is a flowchart of a method of recognizing a barcode of a deposition mask, according to exemplary embodiments.

Referring to FIG. 12, the barcode recognition method may include a first lighting environment photographing operation (operation S210), a first barcode recognition operation (operation S220), a second lighting environment setting operation (operation S230), a second lighting environment photographing operation (operation S240), a second barcode recognition operation (operation S250), a third lighting environment setting operation (operation S260), and a third lighting environment photographing operation (operation S270).

The barcode recognition method of FIG. 12 is different from the barcode recognition method of FIG. 10 in that it further includes setting a lighting unit 130 to a third lighting environment L3 and photographing a barcode 150 in association with the third lighting environment L3 (operations S260 and S270) when an image of the barcode 150 captured in a second lighting environment L2 is not recognized. In other words, any suitable number of barcode photographing and recognition operations may be performed to increase the recognition rate of the barcode recognition apparatus 10.

Operations S210 through S240 are substantially the same as operations S110 through S140 of FIG. 10, and, as such, to avoid obscuring exemplary embodiments described herein, duplicative descriptions are omitted.

In the second barcode recognition operation (operation S250), a recognition unit 110 may recognize a barcode image 160. In the barcode image 160, a first control unit 112 may recognize a finder region 151, an ID region, and a data region 152. When failing to recognize the finder region 151 or the ID region, a first control unit 112 may transmit one or more signals instructing a change in the lighting environment to a lighting control unit 120. A barcode image recognition method used in the second barcode recognition operation (operation S250) is substantially the same as the barcode image recognition method used in the first barcode recognition operation (operation S120), and, as such, to avoid obscuring exemplary embodiments described herein, duplicative descriptions are omitted.

In the third lighting environment setting operation (operation S260), the lighting control unit 120 may set the lighting environment to the third lighting environment L3. The third lighting environment L3 may be different from the first lighting environment L1 and the second lighting environment L2. A second control unit 122 may receive the signal(s) instructing a change in the lighting environment from the first control unit 112. The second control unit 122 may change the lighting environment of a lighting unit 130 to the third lighting environment L3, which may be stored in the second storage unit 121.

The third lighting environment L3 may be different from the first lighting environment L1 and the second lighting environment L2 in the on/off state of at least one of a plurality of lamps 130a through 130d, an angle of light emitted from at least one of the lamps 130a through 130d with respect to the barcode 150, or the luminance of at least one of the lamps 130a through 130d.

When the lighting environment is changed, luminance of light in various regions of the barcode 150 provided with the light and the state of a light and shade pattern of the barcode 150 may also be changed. As such, even if the barcode image 160 captured in the previous lighting environment is not recognized by the recognition unit 110, a barcode image 160 captured in the changed lighting environment can be recognized by the recognition unit 110. That is, when failing to recognize the barcode 150, the barcode recognition apparatus 10 may reattempt to recognize the barcode 150 by changing the lighting environment and photographing the barcode 150 again in association with the changed lighting environment. As such, the barcode recognition rate of the barcode recognition apparatus 10 may be improved. The improved barcode recognition rate may prevent the barcode 150 from being not recognized due to the abrasion, wear, etc., of the barcode 150 and may prevent a deposition mask 140 from being discarded due to the abrasion, wear, etc., of the barcode 150. In this manner, the life of the deposition mask 140 may be extended.

In the third lighting environment photographing operation (operation S270), a photographing unit 100 may take a photograph of the barcode 150 in association with the third lighting environment L3. In this manner, a distance between the deposition mask 140 and the photographing unit 100 may be modified, but the method used to generate a barcode image may be substantially the same as those in the first lighting environment photographing operation (operation S210) or the second lighting environment photographing operation (operation S240). Since the lighting environment has been changed, a barcode image 160 captured in the third lighting environment photographing operation (operation S270) may be different from the barcode images 160 captured in the first lighting environment photographing operation (operation S210) and the second lighting environment photographing operation (operation S240). The barcode image 160 captured in the third lighting environment L3 may be recognized by the recognition unit 110.

Figure 13:
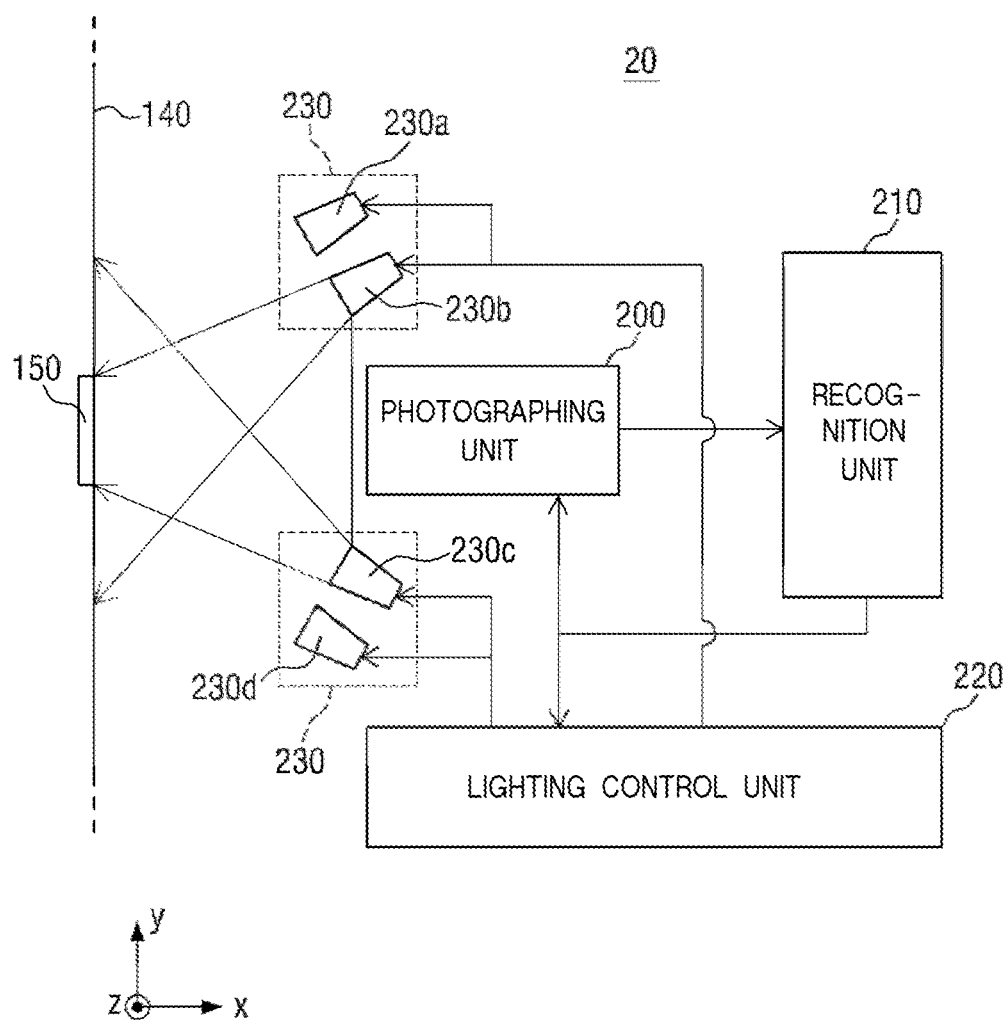
FIG. 13 is a block diagram of an apparatus for recognizing a deposition mask and a barcode of the deposition mask, according to exemplary embodiments.

FIG. 13 is a block diagram of an apparatus 20 for recognizing a deposition mask 140 and a barcode of the deposition mask 140, according to exemplary embodiments.

Referring to FIG. 13, the barcode recognition apparatus 20 includes a lighting unit 230, a lighting control unit 220, a photographing unit 200, and a recognition unit 210.

The photographing unit 200 is substantially the same as the photographing unit 100 of FIG. 1, and, as such, duplicative descriptions have been omitted to avoid obscuring exemplary embodiments described herein.

The recognition unit 210 may store a barcode image captured by the photographing unit 100 and recognize the barcode image. The recognition unit 210 may provide a signal instructing a change in the lighting environment setting to the lighting control unit 220. The recognition unit 210 may recognize each of a plurality of barcode images generated by photographing the same barcode 150 in different lighting environments and select a barcode image with a highest recognition rate.

The lighting control unit 220 may change the setting of the lighting unit 230 in response to the signal instructing a change in the lighting environment setting received from the recognition unit 210. The changed lighting environment may correspond to any one of one or more lighting environments stored in the lighting control unit 220.

The lighting unit 230 may include a first lamp 230a, a second lamp 230b, a third lamp 230c, and a fourth lamp 230d. The first through fourth lamps 230a through 230d are substantially the same as the first through fourth lamps 130a through 130d of FIG. 1, and, as such, duplicative descriptions have been omitted to avoid obscuring exemplary embodiments described herein.

Figure 14:
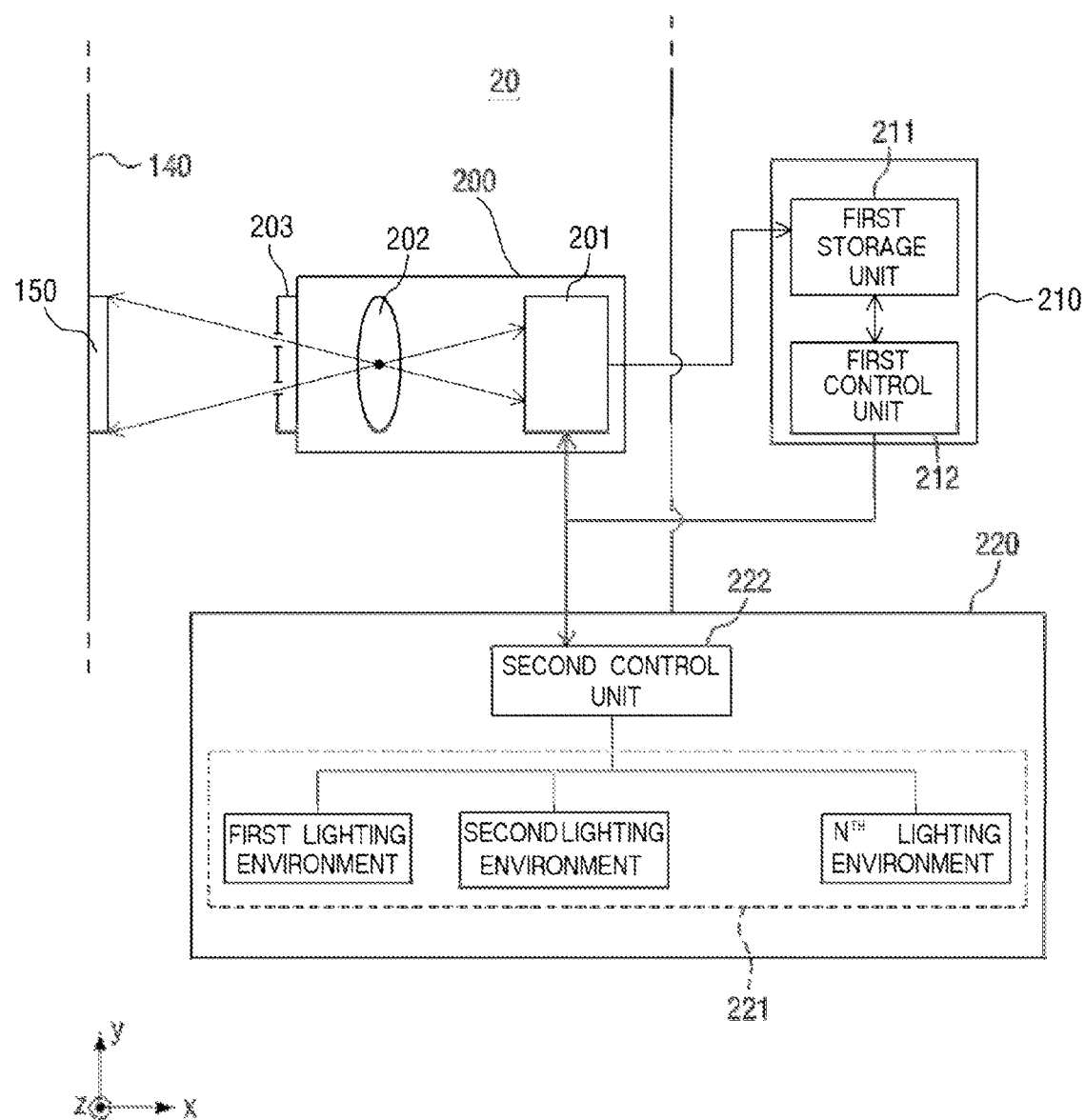
FIG. 14 is a block diagram of a photographing unit, a recognition unit, and a lighting control unit, according to exemplary embodiments.

FIG. 14 is a block diagram of the photographing unit 200, the recognition unit 210, and the lighting control unit 220, according to exemplary embodiments.

The recognition unit 210 may include a first storage unit 211 and a first control unit 212. The first control unit 212 may count the number of barcode images stored in the first storage unit 211. When the number of barcode images stored in the first control unit 212 is less than M, the first control unit 212 may send one or more signals instructing at least one change in the lighting environment setting(s) to the lighting control unit 220. A value of M can be varied by a user.

The lighting control unit 220 may include a second storage unit 221 and a second control unit 222. The second storage unit 221 may include first through $n^{th}$ lighting environments L1 through Ln. The second control unit 222 may be connected to the first control unit 212 of the recognition unit 200 and receive the signal(s) instructing the at least one change in the lighting environment setting(s) from the first control unit 212. The second control unit 222 may change the lighting environment setting(s) of the lighting unit 230 to an $m^{th}$ lighting environment Lm (where "m" is a natural number greater than zero) stored in the second storage unit 221.

The $m^{th}$ lighting environment Lm may be different from the first lighting environment L1 in the on/off state of at least one of the first through fourth lamps 230a through 230d of the lighting unit 230, an angle of light emitted from at least one of the first through fourth lamps 230a through 230d with respect to the barcode 150, or the luminance of at least one of the first through fourth lamps 230a through 230d.

When the lighting environment is changed, luminance of light in each region of the barcode 150 provided with the light and the state of a light and shade pattern of the barcode 150 may also be changed. As such, even if a barcode image captured in a previous lighting environment is not recognized by the recognition unit 210, a barcode image captured in a subsequent, changed lighting environment may be recognized by the recognition unit 210. That is, the barcode recognition apparatus 20 may recognize the barcode 150 using a barcode image with the highest recognition rate from among a plurality of barcode images captured in association with different lighting environments. In this manner, the barcode recognition rate of the barcode recognition apparatus 12 may be improved. The improved barcode recognition rate may prevent the barcode 150 from being not recognized due to the abrasion, wear, etc., of the barcode 150 and may prevent the deposition mask 140 from being discarded due to the abrasion, wear, etc., of the barcode 150. In this manner, the life of the deposition mask 140 may be extended.

The photographing unit 200 may generate a barcode image by re-photographing the barcode 150 in association with the $m^{th}$ lighting environment Lm, and the generated barcode image may be stored in the first storage unit 211. In this manner, a plurality of barcode images captured in different lighting environments may be stored in the first storage unit 211 and selected from by the recognition unit 210. It is also noted that photographing unit 200 may include one or more aperture screens 203 to control (or otherwise regulate) the amount of ambient light entering the photographing unit 200. In this manner, the quality of the barcode images may be increased.

When the number of barcode images stored in the first storage unit 211 of the recognition unit 210 is M or more, the first control unit 212 may recognize the barcode images as the barcode 150. In addition, the first control unit 212 may transmit to the photographing unit 200 one or more signals indicating that the barcode images are recognized as the barcode 150, so that photographing operations of the barcode 150 may be stopped.

The first control unit 212 may select a barcode image with the highest recognition rate from among a plurality of barcode images stored in the first storage unit 211. When a barcode image has the highest recognition rate, a difference between a value of each region of the barcode image and a threshold value is largest. That is, a highly contrasted barcode image having a largest difference between the value of each region of the barcode image and the threshold value may be a barcode image with the highest recognition rate. A barcode image selected by the first control unit 212 may be recognized as the barcode 150.

Figure 15:
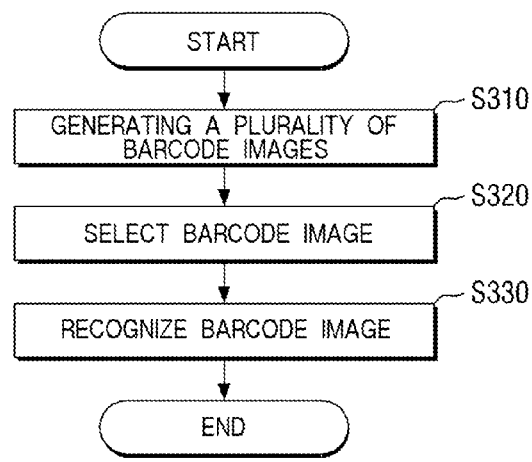
FIG. 15 is a flowchart of a method of recognizing a barcode of a deposition mask, according to exemplary embodiments.
Figure 16:
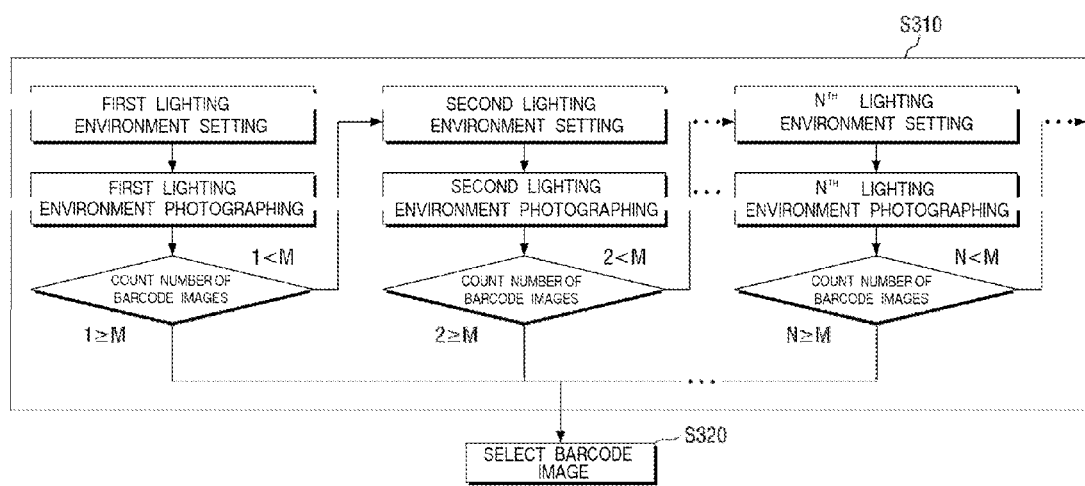
FIG. 16 is a flowchart of a method of generating a plurality of barcode images, according to exemplary embodiments.

FIG. 15 is a flowchart of a method of recognizing a barcode of a deposition mask, according to exemplary embodiments. FIG. 16 is a flowchart of a method of generating a plurality of barcode images, according to exemplary embodiments.

Referring to FIG. 15, the barcode recognition method may include an operation of generating a plurality of barcode images (operation S310), an operation of selecting a barcode image (operation S320), and an operation of recognizing a barcode (operation S330).

In the operation of generating the barcode images (operation S310), a photographing unit 200 may generate a plurality of barcode images 160 by photographing a barcode 150 in a plurality of lighting environments to which a lighting environment of a lighting unit 230 is set.

Referring to FIG. 16, a first barcode image may be generated by setting the lighting environment of the lighting unit 230 to a first lighting environment and photographing the barcode 150 in the first lighting environment. The generated first barcode image may be stored in a first storage unit 211 of a recognition unit 210. A first control unit 212 may count the number of barcode images stored in the first storage unit 211, and, when the number of the stored barcode images is less than M (which may be set by a user), the first control unit 210 may send, to a lighting control unit 220, one or more signals instructing at least one change in the lighting environment of the lighting unit 230. In response to the signal(s), the lighting control unit 220 may change one or more of the lighting environment settings of the lighting unit 230 to configure a second lighting environment, and the photographing unit 200 may generate a second barcode image by photographing the barcode 150 in association with the second lighting environment. A barcode photographing apparatus 20 may generate a plurality of barcode images by repeatedly photographing the barcode 150 in different lighting environments until the number of the stored barcode images becomes M or more and may store the generated barcode images in the first storage unit 211.

Referring back to FIG. 15, in the operation of selecting the barcode image (operation S320), the recognition unit 210 may select a barcode image with a highest recognition rate from the barcode images 160. That is, the first control unit 212 may select a barcode image having a largest difference between a threshold value and a value allocated to each region of the barcode image as a barcode image with the highest recognition rate.

In the operation of recognizing the barcode (operation S330), the recognition unit 210 may recognize the barcode image 160 with the highest recognition rate.

According to exemplary embodiments, the operation of selecting the barcode image (operation S320) and the operation of recognizing the barcode (operation S330) may be performed simultaneously. That is, selecting the barcode image 160 with the highest recognition rate and recognizing the barcode 150 from the selected barcode image 160 can be performed simultaneously.

According to exemplary embodiments, a recognition rate of a barcode formed on a deposition mask may be improved. As such, it may be possible to prevent a process delay due to a recognition error of the barcode formed on the deposition mask. Furthermore, the life of the deposition mask having the barcode may be extended.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method, comprising:
receiving, in association with a lighting environment, an image of at least a portion of a deposition mask, the deposition mask comprising a barcode;
processing the image to identify a finder region of the barcode;
processing, in response to identifying the finder region, the image to identify a data region of the barcode, the data region being disposed outside the finder region;
determining that the data region of the barcode is not recognizable;
generating, in response to determining that the data region of the barcode is not recognizable, one or more control signals configured to modify the lighting environment; and
causing, at least in part, a second image of at least the data region of the barcode to be generated in association with a modified lighting environment.

2. The method of claim 1, wherein the at least one control signal is configured to modify an on/off state of at least one light emitting unit configured to illuminate the barcode.

3. The method of claim 1, wherein the at least one control signal is configured to modify an angle of light incident on the barcode.

4. The method of claim 1, wherein the at least one control signal is configured to modify luminance of at least one light emitting unit configured to illuminate the barcode.

5. The method of claim 1, wherein the at least one control signal is configured to modify luminance of at least one light emitting unit configured to illuminate the barcode and an angle of light incident on the barcode.

6. The method of claim 1, further comprising:
receiving a second barcode image of the barcode, the second barcode image being associated with the modified lighting environment;
determining whether the second barcode is recognizable;
generating, in response to determining that the second barcode is not recognizable, one or more second control signals configured to modify the modified lighting environment; and
causing, at least in part, a third barcode image to be generated in association with a further modified lighting environment.

7. The method of claim 1, wherein the barcode is embossed or engraved on a surface of the deposition mask.

8. A method, comprising:
causing, at least in part, a first photograph of a barcode of a deposition mask to be generated according to a first predetermined wavelength of illumination setting;
receiving a second predetermined wavelength of illumination setting different from the first predetermined wavelength of illumination setting;
causing, at least in part, a second photograph of the barcode of the deposition mask to be generated according to the second predetermined wavelength of illumination setting;
receiving a first digital barcode image corresponding to the first photograph and a second digital barcode image corresponding to the second photograph;
determining which of the first and second digital barcode images is associated with a higher recognition rate; and performing a recognition operation on the digital barcode image with the higher recognition rate.

9. The method of claim 8, wherein:
each of the first and second digital barcode images comprises a plurality of first regions and a plurality of second regions associated with different information; and
determining which of the first and second digital barcode images is associated with the higher recognition rate comprises:
  comparing differences between a threshold value and a brightness value for each of the plurality of first regions and each of the plurality of second regions in each of the first and second digital barcode images; and
  selecting the barcode image with a larger difference in brightness values as the barcode image associated with the higher recognition rate.

10. The method of claim 8, wherein the barcode is embossed or engraved on a surface of the deposition mask.

11. The method of claim 8, wherein:
the first predetermined wavelength of illumination setting is associated with a first lighting environment;
the second predetermined wavelength of illumination setting is associated with a second lighting environment; and
the first and second lighting environments are different from one another in at least one of luminance, an on/off state of at least one light emitting unit configured to illuminate the barcode, and an angle of light incident on the barcode.

12. An apparatus, comprising:
a photographing unit configured to generate, in association with a lighting environment, an image of a barcode of a deposition mask;
at least one light emitting unit configured to illuminate the barcode according to the lighting environment; and
a recognition unit configured to determine whether the image is recognizable,
wherein, in response to a determination that the image is not recognizable, the recognition unit is further configured to:
  generate a first control signal to modify the lighting environment, the first control signal being configured to at least modify a barrier configuration to block and/or redirect a portion of illumination from the at least one light emitting unit to affect an incident pattern of illuminated and shaded regions on the barcode; and
  generate a second control signal to cause the barcode to be re-imaged in association with a modified lighting environment.

13. The apparatus of claim 12, further comprising:
a lighting control unit configured to control the at least one light emitting unit,
wherein, in response to reception of the first control signal, the lighting control unit is further configured to modify control of the at least one light emitting unit to provide the modified lighting environment.

14. The apparatus of claim 13, wherein the first control signal is configured to modify an on/off state of the at least one light emitting unit.

15. The apparatus of claim 13, wherein the first control signal is configured to modify an angle of light provided by the at least one light emitting unit.

16. The apparatus of claim 13, wherein the first control signal is configured to modify luminance of the at least one light emitting unit.

17. The apparatus of claim 13, wherein the first control signal is configured to modify luminance of the at least one light emitting unit and an angle of light provided by the at least one light emitting unit.

18. The apparatus of claim 12, wherein the at least one light emitting unit comprises at least four light emitting units disposed about the photographing unit.

19. The apparatus of claim 12, wherein the barcode is engraved or embossed on the deposition mask.

20. The apparatus of claim 12, wherein the photographing unit is a complementary metal oxide semiconductor (CMOS) image sensor or a charged coupled device (CCD) image sensor.

* * * * *